J. D. Frary,

Faucet,

Nº 46,555.    Patented Feb. 28, 1865.

Witnesses:
R. H. Griswold
Jeremy W. Bliss

Inventor:
J. D. Frary

UNITED STATES PATENT OFFICE.

JAMES D. FRARY, OF NEW BRITAIN, CONNECTICUT.

IMPROVED FAUCET FOR OIL AND OTHER LIQUIDS.

Specification forming part of Letters Patent No. 46,555, dated February 28, 1865.

*To all whom it may concern:*

Be it known that I, JAMES D. FRARY, of New Britain, county of Hartford and State of Connecticut, have invented a new and useful arrangement or combination of old material and device as being peculiarly adapted to the trade and used as a faucet for drawing liquors; and I do hereby declare that the following is a full and exact description thereof, reference being had to the accompanying drawings, and to the letters of reference marked thereon, the nature of which will be readily understood from the specification and drawings.

The object desired to be attained thereby is to provide a cheap, simple, and durable faucet for the trade and use equal in all respects with any now offered to the public.

Figure 1:
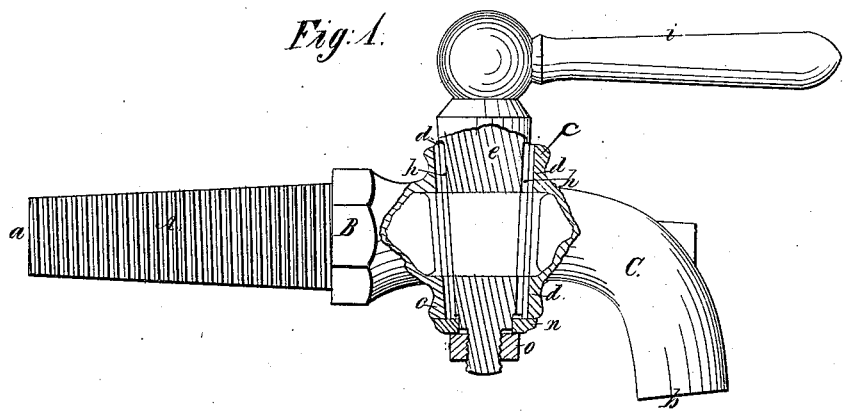
Figure 2:
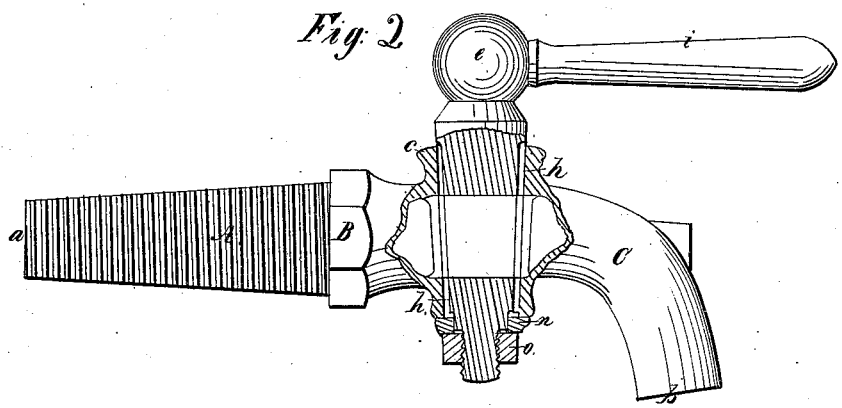
Figure 3:
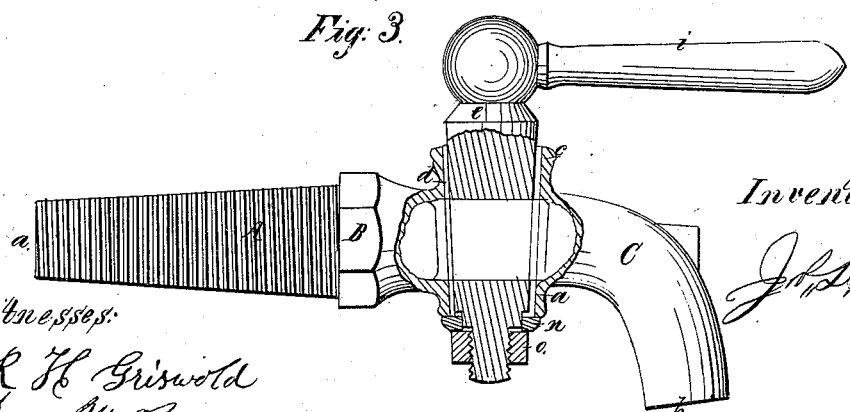

Figures 1, 2, and 3 are side views, broken out at the juncture of the plug with the tube so as to show its mode of construction in detail.

This faucet is made in nearly all respects in the same way of those now in common use, with the following exceptions—that the orifice of the body of the tube and the plug which is fitted into said orifice are, either one or the other of them, bushed or sheathed with metal of such a nature as is not liable to rust, which (the rust) would be likely to produce a wearing tendency, and consequently the faucet would be liable to become leaky or otherwise out of order, as very likely would occur when the two surfaces of the socket and plug are made of iron.

In Fig. 1 I have shown the plug orifice having a bushing of metal (of brass) secured therein, and the plug also sheathed with metal of brass, in such a manner as to secure their permanently working together (the two brass surfaces) or the surface of brass and iron together, and thereby producing a superior article to the common brass cock or faucet, while its principal component is cast-iron.

$a$ is the induction end of the tube, made slightly tapering, and having a thread or screw cut thereon, or it is made plain surface and tinned, for the purpose of screwing it into a vessel or for soldering it into a vessel.

$b$ is the eduction end of the tube, curved so as to turn the current of the fluid downward.

$c$ is the body, having an orifice in or through which the plug is fitted.

$d$ is a brass bushing, made or fitted to the orifice in the body $c$.

$e$ is the plug, which is fitted into said orifice to open and close the passage or flow of the liquid in the usual manner.

$h$ is the brass sheathing, secured onto the plug.

$i$ is the handle for operating the faucet.

$n$ is a washer.

$o$ is a nut for holding the plug to its proper place in the orifice.

$p$ is a nut-shape formation for the purpose of turning or screwing the faucet into the vessel.

Figs. 2 and 3 show modifications of the same thing only in part, which may be used to much better advantage than if it were all made of cast-iron. These modifications show in Fig. 2 the plug sheathed without having the bushing in the orifice, and in Fig. 3 the orifice has the bushing, while the plug is made plain without the sheathing, and it is believed from experiment that the faucet made of all iron without bushing and the plug made of iron and sheathed is the best and most durable article—that is, it is found that the working of the two surfaces of the orifice and plug, one of iron and one of brass, or the working together of two distinct metals, as iron and brass, will prove the most durable and efficient.

I have thus endeavored to show the nature, construction, and advantage of this my improvement, so as to enable others skilled to make and use the same.

What I claim, therefore, and desire to secure by Letters Patent, is—

As a new improved article of manufacture—viz., a faucet made of iron having the working surfaces of the orifice and plug made of brass, or brass and iron, in combination with the crooked nozzle $c$, screw or tinned shank $a$, substantially as described.

JAS. D. FRARY.

Witnesses:
JOHN W. HUGHES,
JEREMY W. BLISS.